United States Patent Office
3,516,759
Patented June 23, 1970

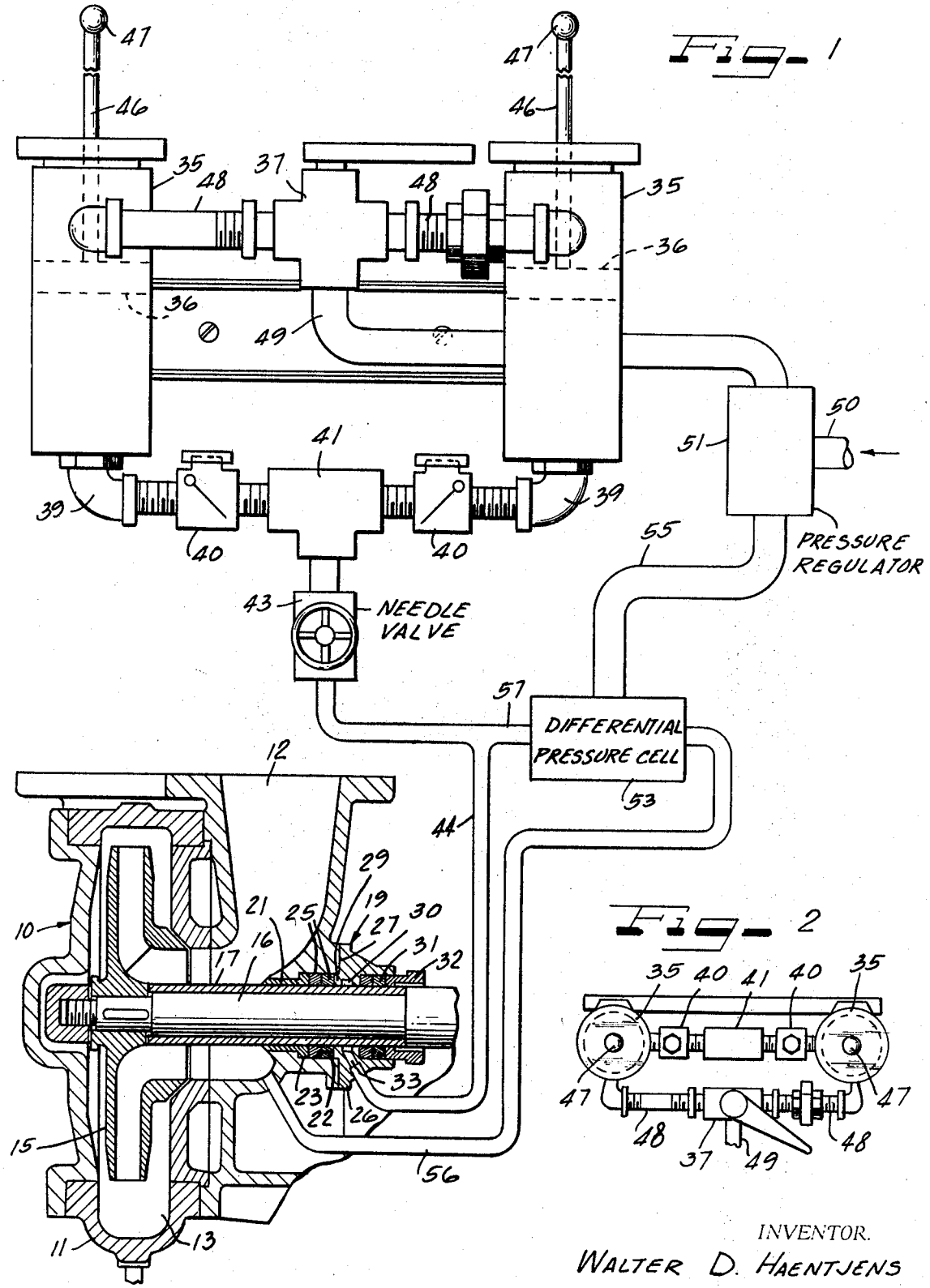

3,516,759
STUFFING BOX LUBRICATION SYSTEM
Walter D. Haentjens, R.D. 1,
Sugarloaf, Pa. 18249
Filed Aug. 7, 1968, Ser. No. 750,862
Int. Cl. F04d 29/00; F01m 1/00; F16c 1/24
U.S. Cl. 415—176          9 Claims

ABSTRACT OF THE DISCLOSURE

Lubrication system for the stuffing box of a centrifugal pump. Lubricant is supplied under pressure at the central portion of the packing gland of the pump at a higher pressure than pump inlet pressure, to insure that any leakage be directed towards the pump inlet and to keep contamination from reaching the atmospheric side of the stuffing box. Lubricant is fed from a dual cylinder grease reservoir. Each cylinder has an independently operable piston and only one cylinder is in operation at a time. The outlet from the cylinders includes a check valve for each cylinder and a needle valve for flow regulation. The pistons are operated by fluid under pressure, such as air, and the pressure of the operating fluid is controlled by a differential pressure cell connected between the pump inlet and the lubricant pressure line, supplying lubricant under pressure to the stuffing box. The pressure of lubricant entering the stuffing box is thus under the control of pump inlet pressure and varies as pump inlet pressure varies, to provide the required differential in pressure between pump inlet pressure and lubricant pressure in the packing gland.

BACKGROUND OF THE INVENTION

The present invention is an improvement in the stuffing box disclosed in my Pat. No. 2,743,120, dated Apr. 24, 1956 in that a pre-selected differential in pressure may be attained between pump inlet pressure and the pressure of lubricant in the stuffing box, governed by pump inlet pressure, and lubricant pressure in the stuffing box, to insure leakage be directed toward the pump inlet, and to keep contamination from reaching the atmospheric side of the stuffing box.

SUMMARY AND OBJECTS OF THE INVENTION

The present invention is directed to a stuffing box lubrication system for centrifugal pumps in which lubricant may be continuously supplied to the pump without interruption, under the control of a pressure regulator operated by the differential in pressure between the pump inlet pressure and the pressure of lubricant in the stuffing box, to provide a pre-selected differential pressure between pump inlet pressure and lubricant pressure in the stuffing box, with a resultant prevention of contamination from reaching the atmospheric side of the stuffing box and a reduction in lubricant consumption to a minimum.

A principal object of the present invention, therefore, is to provide a simplified form of stuffing box lubrication system in which the pressure of lubricant supplied to the stuffing box is controlled by the differential in pressure between pump inlet pressure and stuffing box lubricant pressure.

Another object of the invention is to provide an improved form of lubricating system for pumps and the like arranged to provide an uninterrupted supply of lubricant to the pump stuffing box at a regulated pressure, determined by pump inlet pressure.

A still further object of the invention is to improve upon stuffing box lubrication systems for centrifugal pumps and the like by supplying lubricant under pressure to the stuffing box and controlling the supply of lubricant under pressure to the stuffing box by the output of a differential pressure cell connected between the lubricant inlet to the stuffing box and the inlet to the pump.

These and other objects of the invention will appear from time to time as the following specification proceeds and with reference to the accompanying drawings.

DESCRIPTION OF THE DRAWINGS

FIG. 1 shows a centrifugal pump in vertical section and diagrammatically shows a lubricating system constructed in accordance with the principles of the present invention for supplying lubricant to the stuffing box of the pump; and FIG. 2 is a plan view of the supply system for supplying lubricant to the pump stuffing box.

DESCRIPTION OF PREFERRED EMBODIMENT OF INVENTION

In FIG. 1 of the drawings, I have shown in vertical section a portion of a centrifugal pump 10 including a pump housing 11 having an inlet 12 leading into said housing and an outlet (not shown) leading from the periphery of a pumping chamber 13 contained within said housing. The pump also includes an impeller 15 within said pumping chamber and keyed or otherwise secured to a horizontal impeller shaft 16, driven from a suitable motor (not shown) in a conventional manner. A wear resistant sleeve 17 extends along the portion of the shaft 16 extending into the pump housing in liquid tight relationship with respect to said shaft and is pinned or otherwise secured thereto, to rotate therewith.

A stuffing box generally indicated by reference character 19 seals the pump housing from leaking along the sleeve 17. The stuffing box 19 is a balanced pressure stuffing box and generally includes a neck ring 21 extending along the sleeve 17 in a shaft opening 22 leading into the pump housing. The neck ring 21 has a flanged outer end portion 23 forming a shoulder abutting a complementary shoulder formed in the shaft opening 22 and limiting the distance said neck ring 21 extends into the pump inlet 12. A series of conventional packing rings 25 abut the flange 23 of the neck ring 21 and are abutted by a sealing sleeve 26 extending about the sleeve 17 and fixedly secured to an end face 27 extending about the shaft opening 22 and secured to said end face as by machine screws, or any other suitable securing means.

The sealing sleeve 26 has an annular portion 29 extending radially inwardly of the end face 27 into the shaft opening 22 and abutting an outer packing gland 25. The sealing ring 26 also has an annular passageway 30 in said annular extension opening to the sleeve 17. The opposite face of the annular extension 29 from the packing ring 25 abuts an inner packing ring of a series of packing rings 31, maintained in position, as by a packing gland 32. A lubricant port 33 leads into the sealing ring 26 to the annular passageway 30 for supplying lubricant thereto. The packing rings 25 thus seal the pump inlet while the packing rings 31 seal the lubricant system to atmosphere.

Referring now in particular to the means for supplying lubricant to the lubricant port 33 to balance or slightly overcome the internal pump inlet pressure, a pair of lubricant cylinders 35, 35 having pistons 36, 36 therein, provide dual lubricant reservoirs alternately operable one at a time under the selection of a three-way valve 37 in a manner which will hereinafter more clearly appear as this specification proceeds. The lubricant may be a grease compatable with the liquid being pumped and the pressure of the grease may be controlled in accordance with inlet pressure to assure continuous packing lubrication with a minimum amount of grease admitted to the pumped liquid.

The lubricant cylinders 35 each have an outlet connection 39 leading from the head end thereof and herein shown as being an elbow. The elbows 39 have communication with individual check valves 40, shown as having connection with a common T 41 and preventing the back flow of lubricant from one cylinder 35 to the other. The T 41 has connection at its discharge end with a needle valve 43 connected with a lubricant conduit 44, having connection with the lubricant inlet port 33, to supply lubricant under pressure thereto.

Each piston 36 has a rod 46 extending therefrom through the piston rod end of the associated cylinder. The rods 46 each have a ball 47 on the outer end thereof. The balls may be of a distinctive color, such as red, and serve to visually indicate the positions of the associated pistons 36, and the amount of grease in each cylinder. Fluid under pressure, such as air, is supplied to the rod end of either of the cylinders 35 and pistons 36 therein under the control of the three-way valve 37 through pressure lines 48 leading from said three-way valve 37, and having communication with the individual cylinders 35, to effect movement of the associated piston 36 toward the outlet of the respective cylinder. A pressure line 49 leads into the three-way valve 37, for supplying fluid under pressure thereto to be admitted to either cylinder 35 to force lubricant from a selected cylinder 35 along the lubricant passageway 44 to the lubricant port 33. Fluid under pressure is supplied to the pressure line 49 through a fluid pressure line 50, connected with a suitable source of supply to fluid under pressure. The pressure line 50 is connected with a pressure regulator valve 51 having connection at its outlet with the fluid pressure line 49 for supplying fluid under pressure thereto at a selected pressure, governed by said pressure regulator 51. The pressure regulator 51 may be of any conventional form so need not herein be shown or described in detail.

A differential pressure cell 53 is provided to operate the pressure regulator 51. Said differential pressure cell 53 has a pressure line 55 leading from the output end of said cell, and having connection with the pressure regulator 51 to regulate said pressure regulator in a well known manner. The differential pressure cell and pressure regulator thus provide a selected pressure of operating fluid in the line 49, and either line 48, to operate either piston 36, to eject grease from its respective cylinder at a pressure determined by the differential in pressure between pump inlet pressure and lubricant pressure in the stuffing box 19.

The differential pressure cell 53 has connection with the pump inlet 12 through an inlet pressure line 56, and is connected with the lubricant line 44 through a lubricant pressure line 57.

The differential pressure cell may be of any conventional form and is no part of the present invention, so need not herein be shown or described in detail, and is operated by the differential in pressure between pump inlet pressure in the inlet pressure line 56 and the pressure of lubricant in the lubricant pressure line 44, to operate the pressure regulator 51 to effect the supply of lubricant to the port 33 of the stuffing box 19 at a pre-determined pressure determined by the difference between pump inlet pressure and lubricant pressure in the stuffing box.

Lubricant may be supplied to the stuffing box at a slightly higher pressure than the pressure at the pump inlet, to insure the direction of leakage toward the pump inlet, and to keep contamination from reaching the atmospheric side of the stuffing box. As for example, the differential pressure cell 53 may set the pressure regulator 51 so that approximately 2 p.s.i. differential in pressure exists between the lubricant inlet port and pump inlet pressure. The pressure of course may be balanced and the pressure of the lubricant may be varied in accordance with the lubricant used and the liquid pumped.

With the lubricating system just described, only pump inlet pressure is involved, which is relatively low. A low feed rate and pressure of lubricant may thus be provided, to reduce contamination of the pumped liquid, and avoid the forcing of grease completely through each side of the packed stuffing box, and the pressure of lubricant entering the stuffing box is always under the control of pump inlet pressure.

Also, by the use of the needle valve 43 and the regulation of pressure to the cylinders 35 by the pressure regulator 51, very small flow rates of lubricant can be attained, to assure a continuous supply of packing lubrication under the control of the three-way valve 37, selecting the lubricant supply cylinder 35, full of lubricant, as lubricant is replenished in the empty cylinder.

While I have herein shown and described one form in which my invention may be embodied, it may readily be understood that various variations and modifications in the invention may be attained without departing from the spirit and scope of the novel concepts thereof.

I claim as my invention:
1. In a lubrication system for pumps and the like,
a pump housing having a pumping chamber therein,
an inlet into said housing and pumping chamber,
an outlet from said pumping chamber,
an impeller within said pumping chamber,
an impeller shaft extending into said housing and pumping chamber,
a stuffing box for said shaft including a series of packing rings,
a lubricant port leading into said stuffing box supplying lubrication to said packing rings,
lubricant supply means supplying lubricant to said lubricant port,
fluid pressure operated means operatively connected with said lubricant supply means supplying the pressure to force lubricant to said lubricant port,
differential control means for said lubricant supply means, controlled by the differential in pressure between lubricant supply pressure and pump inlet pressure,
a pressure connection from said lubricant supply means to said control means supplying pressure to said control means at the pressure of lubricant supplied to said stuffing box,
a second fluid pressure connection from said pump inlet to said control means supplying pressure to said control means at pump inlet pressure and establishing a differential in pressure on said control means, and
a pressure regulator controlled by said control means and regulating the pressure of said fluid pressure operated means and thereby regulating pump inlet pressure in accordance with the differential in pressure between the pressure of lubricant entering said lubricant port and pump inlet pressure.

2. A lubrication system in accordance with claim 1, wherein the control means includes a differential pressure cell operated by the differential in pressure between pump inlet pressure and the pressure of lubricant in said lubricant inlet passageway.

3. The lubrication system of claim 2,
wherein the lubricant supply means includes a needle valve upstream of said port, and
wherein the differential pressure cell is connected with said port downstream of said needle valve.

4. A lubrication system in accordance with claim 1,
wherein the lubricant supply means includes a lubricant cylinder having a piston therein,
wherein a supply connection is provided from said cylinder to said lubricant port, to supply lubricant under pressure to said sealing and packing rings,
wherein the fluid pressure operated control means supplies pressure to force said piston along said cylinder to force lubricant therefrom, and wherein the pressure regulator controlled by the difference in pressure between pump inlet pressure and the pressure of lubricant in said lubricant passageway, controls the pressure of fluid supplied to said cylinder and piston, and thereby controls the pressure of lubricant in said lubricant passageway in accordance with the differential in pressure between pump inlet pressure and the pressure of lubricant supplied to said lubricant port.

5. The lubrication system of claim 4,
wherein the control means includes a differential pressure cell, and
wherein a needle valve is connected with said lubricant port downstream of said cylinder and upstream of said differential pressure cell.

6. A lubrication system in accordance with claim 4,
including two alternately operable lubricant cylinders, each having a piston therein forcing lubricant from the associated cylinder,
a fluid pressure connection to each of said cylinders and pistons including valve means operable to supply fluid under pressure to a selected cylinder,
lubricant passageways leading from said cylinders,
a check valve in each passageway, and fluid pressure connections from said check valves to said lubricant port to accommodate the supply of lubricant to said lubricant port under the control of said valve means,
wherein the pressure regulator supplies fluid under pressure to a selected of said cylinders under the control of said valve needles, and
wherein the control means for said pressure regulator, controlled by the differential in pressure between lubricant pressure in said inlet port and pump inlet pressure comprises a differential pressure cell.

7. A lubrication system in accordance with claim 6, wherein a needle valve is provided downstream of said check valves and upstream of said lubricant port and differential pressure cell to meter lubricant to said lubricant port and stuffing box.

8. A lubrication system in accordance with claim 7,
wherein the packing rings are spaced along said shaft,
wherein lubricant is supplied to said packing rings in the space between said rings, and
wherein the differential pressure cell effects the supply of lubricant into the space between said packing rings at a pressure exceeding pump inlet pressure.

9. A lubrication system in accordance with claim 4, wherein a flow indicator visible to the eye is connected with the piston and moves therewith to indicate the rate of flow of lubricant from said cylinder.

References Cited

UNITED STATES PATENTS

| | | | |
|---|---|---|---|
| 1,086,063 | 2/1914 | Lobnitz | 103—111 |
| 1,721,737 | 7/1929 | Joyce | 103—111 |
| 1,782,656 | 11/1930 | Joyce | 103—111 |
| 1,835,877 | 12/1931 | Joyce | 308—187 |
| 1,859,039 | 5/1932 | Joyce | 308—187 |
| 2,419,681 | 4/1947 | Gartmann | 103—111 |
| 2,743,120 | 4/1956 | Haentjens et al. | 103—111 |

FOREIGN PATENTS 23,431    1906    Great Britain.

HENRY F. RADUAZO, Primary Examiner

U.S. Cl. X.R.

184—1; 308—187